(12) United States Patent
Erlich

(10) Patent No.: US 9,784,558 B2
(45) Date of Patent: Oct. 10, 2017

(54) SENSING OF MIRROR POSITION USING FRINGING FIELDS

(71) Applicant: APPLE INC., Cupertino, CA (US)

(72) Inventor: Raviv Erlich, Rehovot (IL)

(73) Assignee: APPLE INC., Cupertino, CA (US)

( * ) Notice: Subject to any disclaimer, the term of this patent is extended or adjusted under 35 U.S.C. 154(b) by 264 days.

(21) Appl. No.: 14/588,942

(22) Filed: Jan. 4, 2015

(65) Prior Publication Data

US 2015/0204650 A1 Jul. 23, 2015

Related U.S. Application Data

(60) Provisional application No. 61/929,140, filed on Jan. 20, 2014.

(51) Int. Cl.
| | |
|---|---|
| *G01R 27/26* | (2006.01) |
| *G01B 7/30* | (2006.01) |
| *G02B 26/10* | (2006.01) |
| *G02B 26/08* | (2006.01) |

(52) U.S. Cl.
CPC .......... *G01B 7/30* (2013.01); *G02B 26/0833* (2013.01); *G02B 26/10* (2013.01); *G02B 26/085* (2013.01)

(58) Field of Classification Search
CPC ...... G01D 5/12; G01D 5/2451; G01D 5/2455; G01D 5/2458
USPC ...... 324/686, 207.24, 173, 174, 200, 207.11, 324/207.25
See application file for complete search history.

(56) References Cited

U.S. PATENT DOCUMENTS

| | | | | |
|---|---|---|---|---|
| 6,154,013 | A * | 11/2000 | Caamano | H02K 1/02 310/216.046 |
| 6,501,262 | B1 * | 12/2002 | Schneeberger | G01D 5/24476 324/202 |
| RE39,747 | E * | 7/2007 | Peltier | 310/12.11 |
| 2007/0143658 | A1 * | 6/2007 | Low | H04L 1/206 714/755 |
| 2009/0018791 | A1 * | 1/2009 | Dejong | B65H 5/062 702/96 |
| 2009/0245299 | A1 | 10/2009 | Stern et al. | |
| 2011/0109951 | A1 | 5/2011 | Goren et al. | |
| 2012/0206081 | A1 * | 8/2012 | Sun | H02K 41/031 318/686 |

FOREIGN PATENT DOCUMENTS

WO 2014016794 A1 1/2014

OTHER PUBLICATIONS

International Application # PCT/US15/10078 Search Report dated Mar. 23, 2015.
Hofmann et al., "MEMS scanning laser projection based on high-q vacuum packaged 2D-resonators", Moems and Miniaturized Systems X, Proceedings of SPIE, vol. 7930, No. 1, pp. 1-10, Feb. 10, 2011.

* cited by examiner

*Primary Examiner* — Giovanni Astacio-Oquendo
(74) *Attorney, Agent, or Firm* — D. Kligler IP Services Ltd.

(57) ABSTRACT

Mechanical apparatus includes a base and a moving element, which is mounted to rotate about an axis relative to the base. A capacitive rotation sensor includes at least one first electrode disposed on the moving element in a location adjacent to the base and at least one second electrode disposed on the base in proximity to the at least one first electrode. A sensing circuit is coupled to sense a variable capacitance between the first and second electrodes.

16 Claims, 4 Drawing Sheets

SENSING OF MIRROR POSITION USING FRINGING FIELDS

CROSS-REFERENCE TO RELATED APPLICATION

This application claims the benefit of U.S. Provisional Patent Application 61/929,140, filed Jan. 20, 2014, which is incorporated herein by reference.

FIELD OF THE INVENTION

The present invention relates to monitoring the motion of rotating mechanical devices, and particularly of scanning micromirrors.

BACKGROUND

PCT International Publication WO 2014/016794, whose disclosure is incorporated herein by reference, describes scanning micromirrors, which are based on microelectromechanical systems (MEMS). Embodiments described in this publication provide scanning mirror assemblies that include a support structure; a base (also referred to as a gimbal), which is mounted to rotate about a first axis relative to the support structure; and a mirror, which is mounted to rotate about a second axis relative to the base.

In one of the embodiments described in WO 2014/016794, capacitive sensing is used to monitor the rotation of the mirror, using plates of a capacitive sensor that are positioned in proximity to the mirror on opposite sides of the axis of rotation. In the disclosed embodiment, the plates are angled relative to the plane of the support structure, although in other implementations, the plates may be parallel to the plane of the support structure. Changes in the capacitance between the plates and the mirror are measured so as to monitor rotation of the mirror.

SUMMARY

Embodiments of the present invention that are described hereinbelow provide improved techniques for capacitive sensing of miniature moving elements.

There is therefore provided, in accordance with an embodiment of the present invention, mechanical apparatus, which includes a base and a moving element, which is mounted to rotate about an axis relative to the base. A capacitive rotation sensor includes at least one first electrode disposed on the moving element in a location adjacent to the base and at least one second electrode disposed on the base in proximity to the at least one first electrode. A sensing circuit is coupled to sense a variable capacitance between the first and second electrodes.

In disclosed embodiments, the base defines a plane, and the moving element has a mechanical equilibrium position in the plane, such that the first and second electrodes are coplanar when the moving element is in the mechanical equilibrium position. The base and the moving element may be formed from a semiconductor substrate in a microelectromechanical systems (MEMS) process, wherein the electrodes and conductive traces connecting the electrodes to the sensing circuit are deposited on the semiconductor substrate as a part of the MEMS process.

In one embodiment, the moving element includes a gimbal, and the base includes a frame on which the gimbal is mounted. Additionally or alternatively, the moving element may include a mirror, while the base includes a gimbal on which the mirror is mounted.

Typically, the first and second electrodes have respective shapes that are elongated along a direction perpendicular and/or parallel to the axis about which the moving element rotates.

In the disclosed embodiments, the sensing circuit is configured to output, responsively to the sensed capacitance, an indication of an angle of rotation of the moving element relative to the base. In some embodiments, the capacitance sensed by the sensing circuit varies nonlinearly with the angle of rotation of the moving element, and the sensing circuit is configured to apply both a magnitude of the capacitance and a slope of variation of the capacitance with rotation of the moving element in finding the angle of rotation as a function of the sensed capacitance.

There is also provided, in accordance with an embodiment of the present invention, a method for sensing, which includes mounting a moving element to rotate about an axis relative to the base. At least one first electrode is disposed on the moving element in a location adjacent to the base, and at least one second electrode is disposed on the base in proximity to the at least one first electrode. A variable capacitance is sensed between the first and second electrodes as the moving element rotates about the axis.

The present invention will be more fully understood from the following detailed description of the embodiments thereof, taken together with the drawings in which:

DETAILED DESCRIPTION OF EMBODIMENTS

Embodiments of the present invention that are described hereinbelow provide capacitive sensing of the rotation of a moving element relative to a base. In the disclosed embodiments, the moving element is a gimbal, which holds a scanning mirror, while the base is a frame on which the gimbal rotates. Alternatively or additionally, the mirror may be the moving element, while the gimbal is the base. Further alternatively, the principles of the disclosed embodiments may be applied to devices of other types that include moving elements, particularly planar devices, such as MEMS devices.

The disclosed embodiments sense rotation of the moving element without electrodes outside the device plane, which in typical MEMS implementations is the plane of the wafer. Thus, in the case of a scanning mirror or gimbal, for example, sensing of rotation is accomplished using electrodes that have been formed only in the plane of the mirror structure. These embodiments use changes in the capacitance between a pair of electrodes that are positioned side by side in-plane on the mirror structures themselves. The capacitance in this case changes as the result of changes of the fringing electric fields with distance between the electrodes and thus provides a means for accurately monitoring rotation angle.

This sensing approach not only enables accurate measurement, but is also inexpensive and simple to implement. Because the capacitance varies nonlinearly with angle, it can be used for absolute position measurement, based on the location of the peak in the capacitance curve (which typically corresponds to the in-plane, zero-torque angle of the rotating device), as well as the shape of the curve. This mode of measurement is thus resilient in the face of gain variations of amplifiers in the sensing circuit and other factors that could otherwise distort the scale of the capacitance measurement.

In the embodiments that are shown in the figures and are described in detail hereinbelow, capacitive sensors of this sort are used in sensing relative motion between a rotating gimbal and a frame, which serves as the support structure for the gimbal and mirror. In alternative embodiments, not shown in the figures, capacitive sensors based on fringing electric fields may be used, additionally or alternatively, in measuring the rotation angle of the mirror relative to the gimbal. More generally, the principles of the present invention may be applied in monitoring rotating structures of other types, particularly in MEMS devices, in which sensors of this sort can be produced as part of the photolithographic manufacturing process that is used in fabricating the devices themselves.

Figure 1:
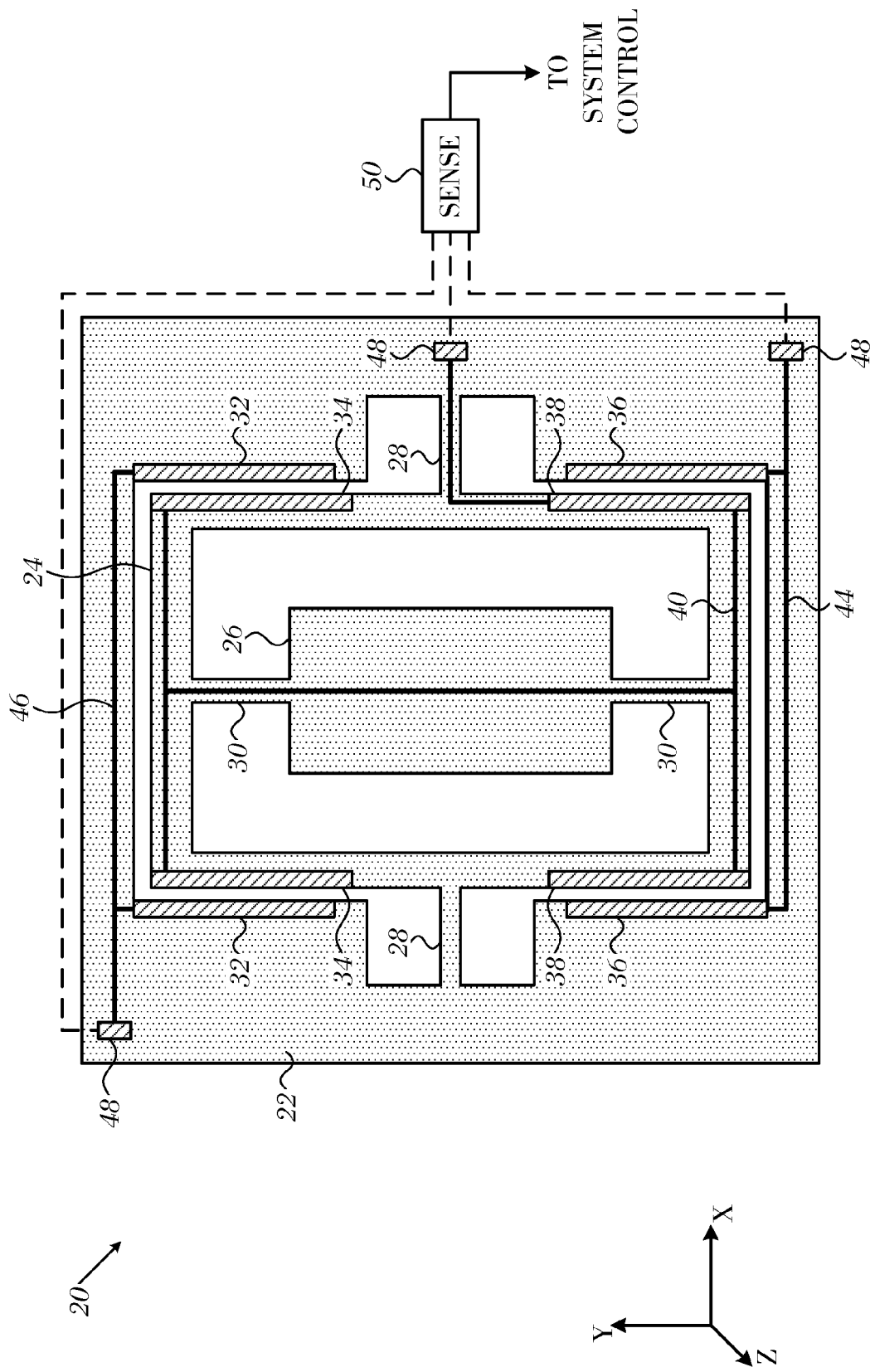
FIG. 1 is a schematic frontal view of a scanning assembly comprising a gimbaled scanning mirror with a capacitive rotation sensor, in accordance with an embodiment of the present invention.

FIG. 1 is a schematic frontal view of a scanning assembly 20, which comprises a gimbaled scanning mirror 26 with a capacitive rotation sensor, in accordance with an embodiment of the present invention. Mirror 26 rotates on a pair of torsion hinges 30 (oriented along the Y-axis in the figure) relative to a gimbal 24, which in turn rotates on another pair of torsion hinges 28 (oriented along the X-axis) relative to a frame 22. Rotation of mirror 26 and gimbal 24 may be driven, for example, by the sorts of magnetic drives that are described in the above-mentioned PCT publication, or by any other suitable sort of drive that is known in the art.

Scanning assembly 20 may typically be produced from a semiconductor wafer by MEMS micro-fabrication processes, in which the borders of mirror 26, gimbal 24 and hinges 28, 30 are defined by a photolithographic mask, and the wafer is then etched to release the moving mirror and gimbal from the surrounding parts of the wafer. As another step in this process, a reflective metal coating (not shown) is deposited on the surface of the mirror. In this same step, or in another metal deposition step, inner metal electrodes 34 and 38 are deposited along the edges of gimbal 24, and outer metal electrodes 32 and 36 are deposited on an adjacent area of frame 22, as shown in the figure. Conductive traces 40, 44, 46 are also deposited on the wafer surface, connecting electrodes 32, 34, 36, 38 to connection pads 48. It may be desirable to deposit an insulating layer, such as an oxide layer, over the wafer before depositing the metal electrodes, in order to eliminate any possible ohmic coupling between electrodes 34 and 38 on gimbal 24 and electrodes 32 and 36 on frame 22.

Each pair of metal electrodes—one electrode 34 or 38 on gimbal 24 and the other electrode 32 or 36 on frame 22—define a capacitor. The capacitance between the electrodes in each pair, due to the fringing fields of the electrodes, varies as a function of the gap between the electrodes and thus changes with the tilt angle of the gimbal. Frame 22 defines a plane, identified for convenience as the X-Y plane in FIG. 1. Gimbal 24 (as well as mirror 26) has a mechanical equilibrium position (zero torque angle) in the plane, such that electrodes 32, 34, 36 and 38 are coplanar when the gimbal is in the mechanical equilibrium position. Electrodes 23, 24, 26 and 38 have elongated shapes, with the long axes of the pairs of electrodes 32/34 and 36/38 oriented in the Y-direction, perpendicular to the axis of hinges 28 about which the rotation of gimbal 24 is to be measured.

To measure the capacitance, and thus the angle of rotation (also referred to as the tile angle) of gimbal 24, a sensing circuit 50 is connected to contact pads 48 and senses the variable impedance between electrodes 32 and 34 and between electrodes 36 and 38. Sensing circuit 50 may sense the impedance, for example, by applying a modulated voltage between the electrodes, via conductive traces 40 44 and 46, and sensing the resulting current (or vice versa). Sensing circuit 50 converts the sensed impedance to a corresponding value of rotation angle, typically based on a calibration function that is determined in advance. For these purposes, sensing circuit 50 may comprise, for example, a digital logic circuit with a frequency synthesizer and suitable digital/analog and analog/digital converters for analog coupling to the electrodes of assembly 20, as well as a digital output, which outputs an indication of the angle of rotation.

Figure 4:
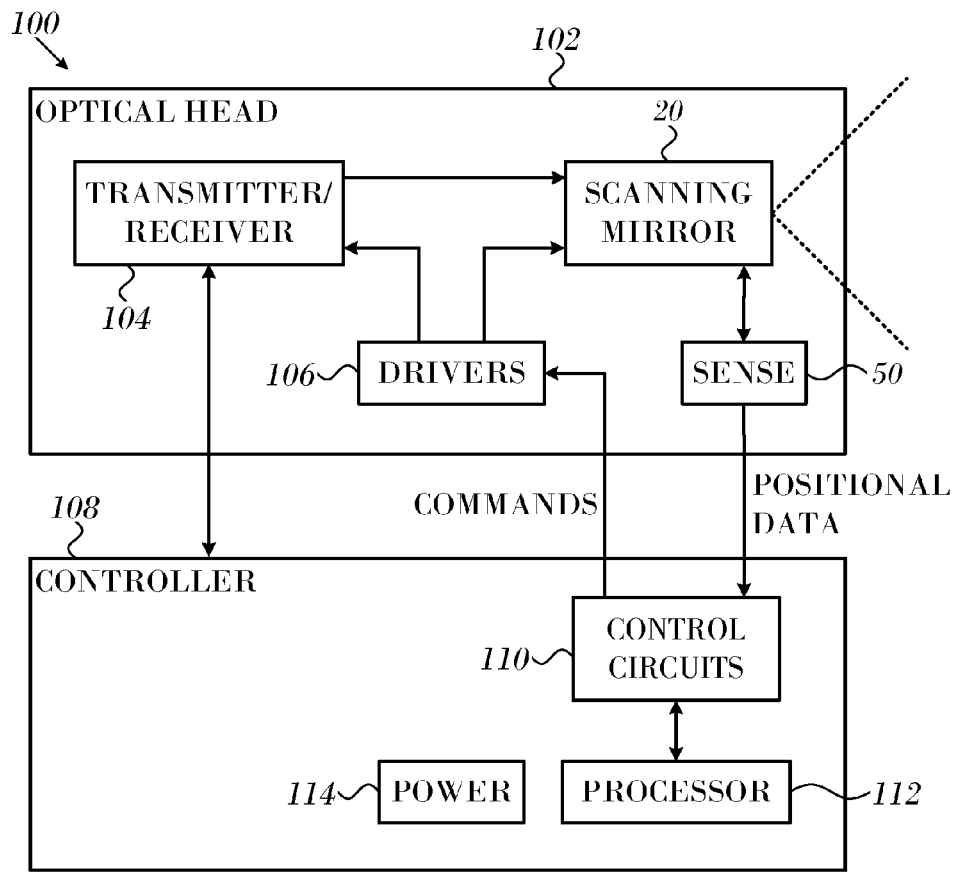
FIG. 4 is a block diagram that schematically illustrates a scanning system, in accordance with an embodiment of the present invention.
Figure 5:
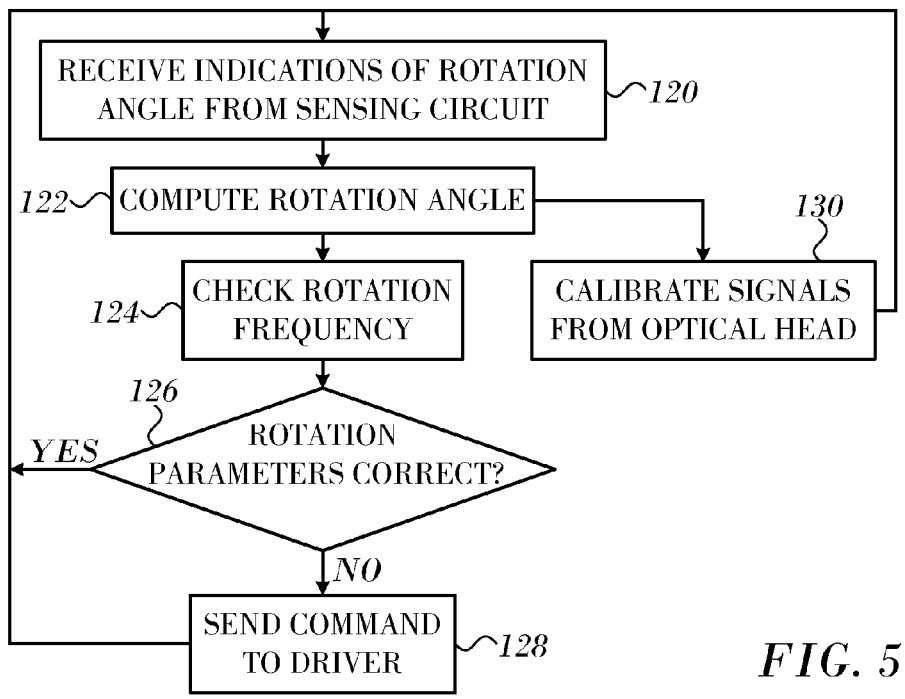
FIG. 5 is a flow chart that schematically illustrates a method for scanning, in accordance with an embodiment of the present invention.

In typical applications, sensing circuit 50 outputs this indication of the rotation angle to a system controller (not shown in the figures), which may use the angular value, for example, in closed-loop control of the rotation of assembly 20. Additionally or alternatively, the system controller may apply the angle measurements provided by sensing circuit 50 in calibrating and controlling the operation of a system based on scanning assembly 20, such as a scanning LIDAR or projection system. Details of a system of this sort are shown in FIG. 4, while methods of control and calibration in such a system are shown in FIG. 5 and are described hereinbelow with reference to these figures.

Figure 2:
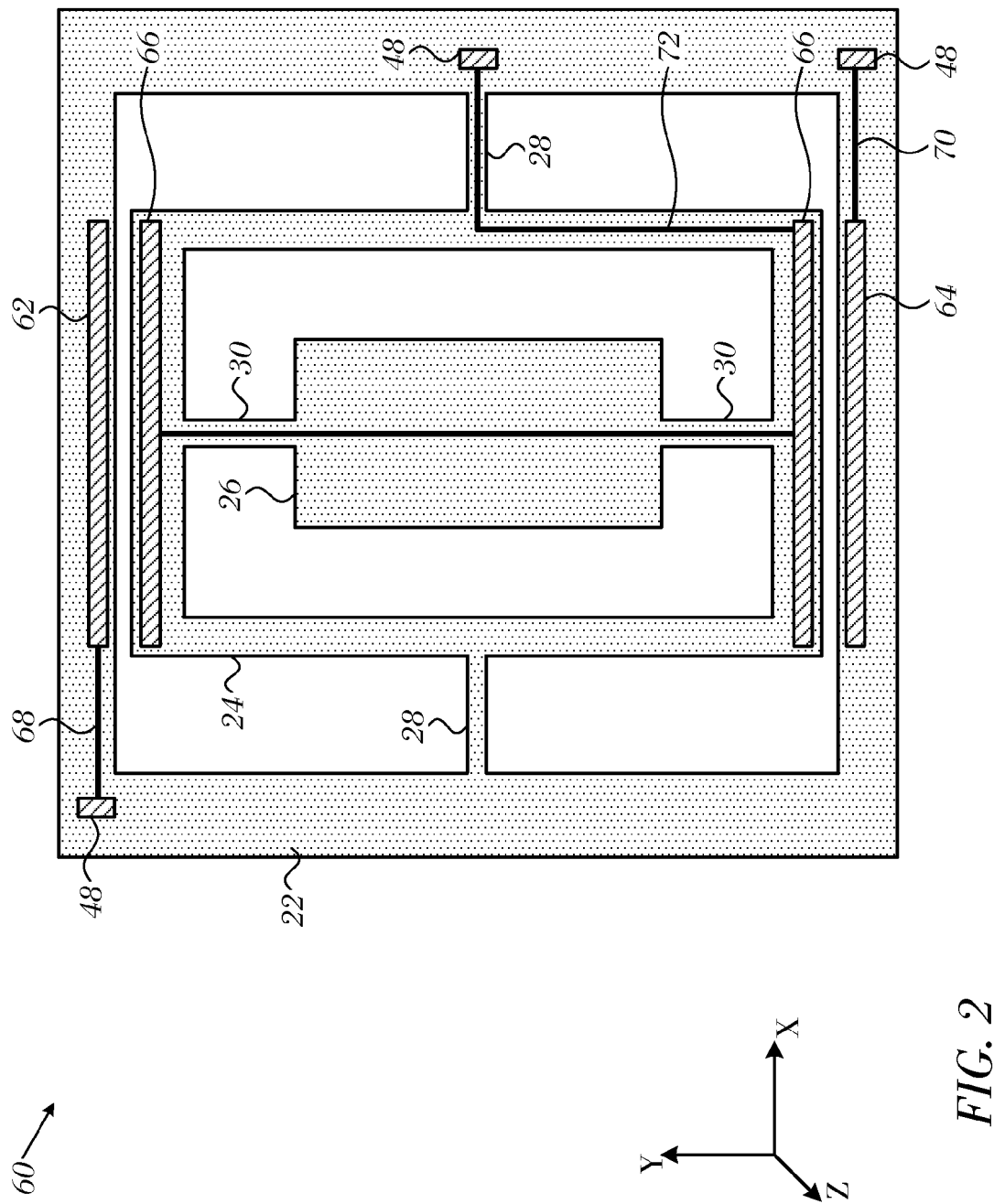
FIG. 2 is a schematic frontal view of a scanning assembly comprising a gimbaled scanning mirror with a capacitive rotation sensor, in accordance with another embodiment of the present invention.

FIG. 2 is a schematic frontal view of a scanning assembly 60, in accordance with an alternative embodiment of the present invention. Assembly 60 is mechanically substantially identical to assembly 20 (FIG. 1), but in the present embodiment, the metal pads that serve as electrodes 62, 64 and 66 of the capacitive rotation sensor are located in different areas of gimbal 24 and frame 22. The long axes of electrode pairs 62/66 and 64/66 in assembly 60 are oriented along the X-direction, parallel to the axis of hinges 28. In other respects, the operation of the capacitive rotation sensor in FIG. 2 is similar to that in the preceding embodiment. The electrode configuration of FIG. 1 is particularly effective for measuring rotation angle, while that of FIG. 2 provides precise sensing of the in-plane, zero-torque position of the gimbal. In practice, the two embodiments may advantageously be combined, with electrodes deployed both perpendicular (as in FIG. 1) and parallel (as in FIG. 2) to the axis of hinges 28 about which gimbal 24 rotates.

As noted earlier, the rotation of mirror 26 relative to gimbal 24 in assembly 60 can be monitored in similar fashion, by depositing electrodes on the mirror and on adjacent areas of the gimbal. Since the mirror has a reflective metal coating anyway, this metal coating may optionally also serve as an electrode of the capacitive sensor.

Figure 3:
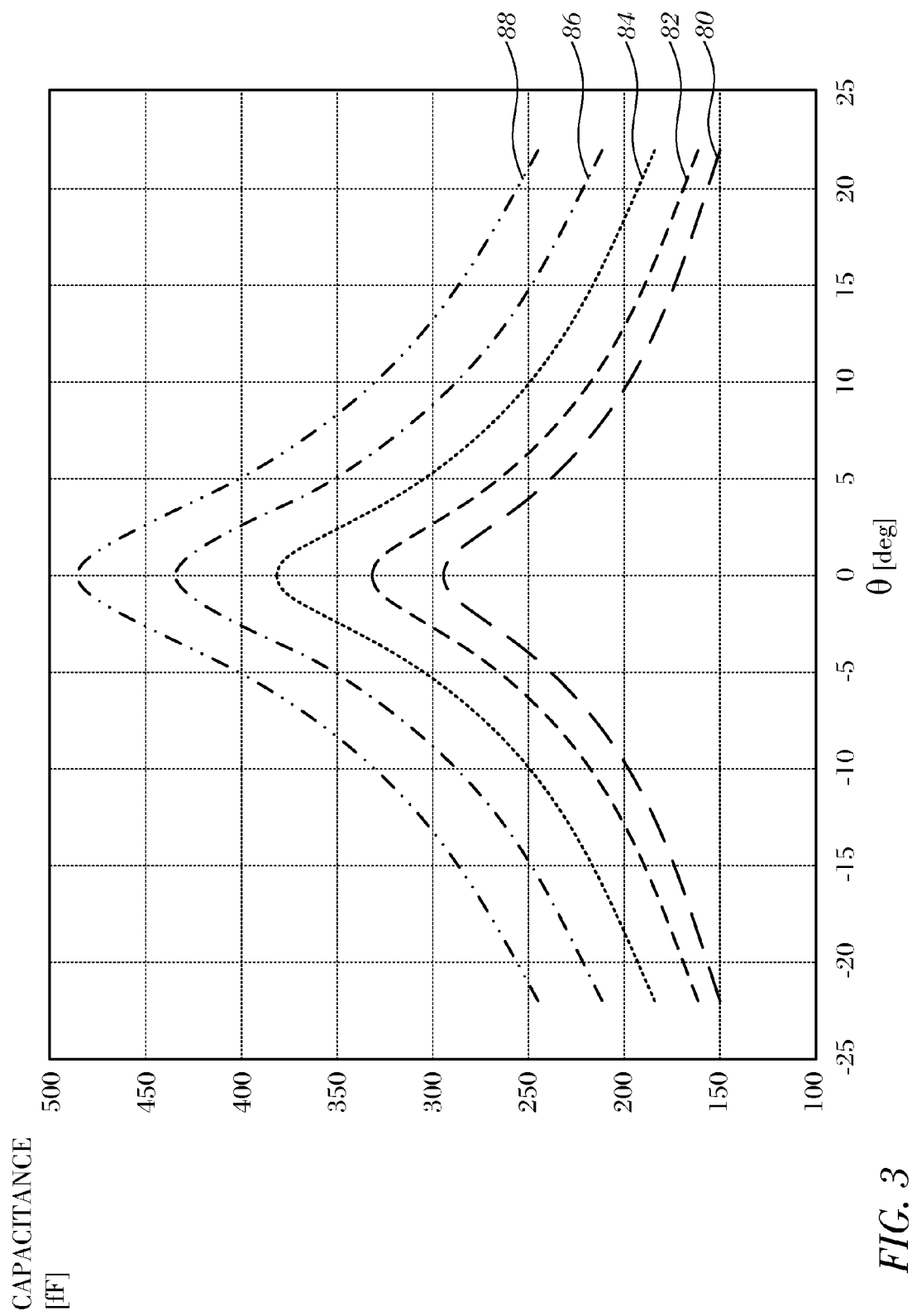
FIG. 3 is a plot showing calculated capacitance curves as a function of rotation angle of a gimbal, in accordance with an embodiment of the present invention.

FIG. 3 is a plot showing calculated capacitance curves 80, 82, 84, 86, 88 as a function of rotation angle of gimbal 24 relative to frame 22, in accordance with an embodiment of the present invention. The calculation is based on a configuration that combines the electrodes of FIGS. 1 and 2, for different lengths L of the side electrodes (32/34 and 36/38). The lengths are smallest in curve 80 and increase in steps up to curve 88, which represents the capacitance using the longest electrodes. As illustrated in FIG. 3, although FIGS. 1 and 2 show particular electrode shapes and sizes, these features of the electrodes can readily be modified to give the desired capacitance range and behavior of the sensor.

As shown by the curves in FIG. 3, the variation of capacitance is not linear in angle. Consequently, both the magnitude of the capacitance and the local slope of the curve can be used in measuring the rotation angle, and the accuracy of measurement can thus be enhanced. Because the two sets of electrodes—those on gimbal 26 and those on frame 24—are formed on the same wafer, any temperature variations will have the substantially same effect on both sets of electrodes and thus will have no more than minimal impact on the measurement accuracy.

Moreover, the nonlinearity of the variation of capacitance with angle can be used for absolute position measurement, based on the location of the central peak (corresponding to the in-plane, zero-torque angle) and the shape of the curve. This mode of measurement is thus resilient in the face of gain variations of the amplifiers and other factors that could otherwise distort the scale of the capacitance measurement. Compensating for such factors in a linear sensing configuration can require a difficult calibration procedure.

Furthermore, although FIGS. 1 and 2 show certain particular arrangements of the capacitive sensing electrodes on frame 22 and gimbal 24, any other suitable arrangement of one or more pairs of electrodes may be used for this purpose, so long as the sizes of and spacing between the electrodes are such as to give a substantial capacitive response that varies with rotation of the gimbal or other structure.

FIG. 4 is a block diagram that schematically illustrates a scanning system 100, in accordance with an embodiment of the present invention. System 100 comprises an optical head 102, which incorporates scanning assembly 20 and sensing circuit 50, as described above. An optical transmitter/receiver 104 transmits pulses of light toward mirror 26 in scanning assembly 20 and receives light returned from the mirror. Alternatively, optical head 102 may comprise only the transmitter or only the receiver. Driver circuits 106 control the scanning frequency, phase and amplitude of scanning assembly 20, as well as controlling operation of transmitter/receiver 104, such as the amplitude and repetition rate of the transmitted pulses.

A controller 108 comprises control circuits 110, which receive signals from sensing circuit 50 and provide control outputs accordingly to drivers 106 under the command of a system processor 112, which comprises one or more processing units. The control outputs may, for example, cause drivers 106 to adjust the frequency, phase and/or amplitude of scanning assembly 20 as necessary. Processor 112 may also use the readings of scanning angle provided by sensing circuit in processing the signals output by the receiver in optical head 102. Controller 108 typically comprises ancillary circuits, such as a power supply 114 and other components that are known in the art. Although the functional elements of controller 108 are shown in FIG. 4, for the sake of conceptual clarity, as separate blocks, some or all of these elements may be combined in a single integrated circuit.

FIG. 5 is a flow chart that schematically illustrates a method for scanning using system 100, in accordance with an embodiment of the present invention. Controller 108 receives a sequence of input signals or data from sensing circuit 50, indicating the rotation angle of scanning assembly 20 as a function of time, at a sense input step 120. Based on these signals or data, the controller computes the actual rotation angle as a function of time, at an angle computation step 122. The computed angles may be used for (at least) two purposes:

Based on the angle readings, controller 108 computes the frequency of rotation of scanning assembly 20, as well as the phase and amplitude of rotation, at a frequency computation step 124. The controller checks these values against corresponding benchmarks, such as preset frequency and amplitude targets, at a parameter checking step 126. If the computed values deviate from the benchmarks, controller 108 sends an appropriate command to driver circuits 106, so as to cause the driver to adjust the scanning parameters. The control loop (regardless of the result of step 126) then returns to step 120 for the next iteration.

Controller 108 may also use the angle readings in calibrating the signals received from transmitter/receiver 104 in optical head 102, at a signal calibration step 130. For example, the angle readings may be used in order to ascertain accurately the angle at which each signal from the receiver is received.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Mechanical apparatus, comprising:
a base;
a moving element, which is mounted to rotate about an axis relative to the base; and
a capacitive rotation sensor, comprising:
electrodes, including a first electrode disposed on the moving element in a location adjacent to the base and a second electrode disposed on the base in proximity to the first electrode; and
a sensing circuit, which is coupled to sense a variable capacitance between the first electrode and the second electrode, which capacitance varies nonlinearly with an angle of rotation of the moving element, and to measure both a magnitude of the capacitance and a slope of variation of the capacitance with rotation of the moving element, and to apply both the measured magnitude and the measured slope in finding and outputting the angle of rotation as a function of time.

2. The apparatus according to claim 1, wherein the base defines a plane, and the moving element has a mechanical equilibrium position in the plane, such that the electrodes are coplanar when the moving element is in the mechanical equilibrium position.

3. The apparatus according to claim 1, wherein the base and the moving element are formed from a semiconductor substrate in a microelectromechanical systems (MEMS) process, and wherein the electrodes and conductive traces connecting the electrodes to the sensing circuit are deposited on the semiconductor substrate as a part of the MEMS process.

4. The apparatus according to claim 1, wherein the moving element comprises a gimbal, and the base comprises a frame on which the gimbal is mounted.

5. The apparatus according to claim 1, wherein the moving element comprises a mirror, and the base comprises a gimbal on which the mirror is mounted.

6. The apparatus according to claim 1, wherein the first electrode and the second electrode have respective shapes that are elongated along a direction perpendicular to the axis about which the moving element rotates.

7. The apparatus according to claim 1, wherein the first electrode and the second electrode have respective shapes that are elongated along a direction parallel to the axis about which the moving element rotates.

8. The apparatus according to claim 1, wherein the sensing circuit is configured to make an absolute measurement of an angular position of the moving element based on a location of a central peak in a curve corresponding to the variation of the capacitance with rotation of the moving element and a shape of the curve.

9. A method for sensing, comprising:
mounting a moving element to rotate about an axis relative to a base;
disposing electrodes on the moving element and the base, including a first electrode disposed on the moving element in a location adjacent to the base and a second electrode disposed on the base in proximity to the first electrode;
sensing, using a sensing circuit, a variable capacitance between the first electrode and the second electrode, which capacitance varies nonlinearly with an angle of rotation of the moving element, as the moving element rotates about the axis;
measuring both a magnitude of the capacitance and a slope of variation of the capacitance with rotation of the moving element; and
applying both the measured magnitude and the measured slope in finding and outputting the angle of rotation as a function of time.

10. The method according to claim 9, wherein the base defines a plane, and the moving element has a mechanical equilibrium position in the plane, such that the electrodes are coplanar when the moving element is in the mechanical equilibrium position.

11. The method according to claim 9, wherein mounting the moving element comprises forming the base and the moving element from a semiconductor substrate in a microelectromechanical systems (MEMS) process, and wherein disposing the electrodes comprises depositing the electrodes and conductive traces connected to the electrodes on the semiconductor substrate as a part of the MEMS process.

12. The method according to claim 9, wherein the moving element comprises a gimbal, and the base comprises a frame on which the gimbal is mounted.

13. The method according to claim 9, wherein the moving element comprises a mirror, and the base comprises a gimbal on which the mirror is mounted.

14. The method according to claim 9, wherein the electrodes have respective shapes that are elongated along a direction perpendicular to the axis about which the moving element rotates.

15. The method according to claim 9, wherein the electrodes have respective shapes that are elongated along a direction parallel to the axis about which the moving element rotates.

16. The method according to claim 9, wherein finding and outputting the angle of rotation comprises making an absolute measurement of an angular position of the moving element based on a location of a central peak in a curve corresponding to the variation of the capacitance with rotation of the moving element and a shape of the curve.

\* \* \* \* \*